Jan. 24, 1939.　　　　M. FLETCHER　　　　2,145,169
SUPPORT FOR NEON TUBES
Filed April 15, 1937

INVENTOR
MILTON FLETCHER
BY
　　　　　　ATTORNEY

Patented Jan. 24, 1939

2,145,169

UNITED STATES PATENT OFFICE 2,145,169

SUPPORT FOR NEON TUBES

Milton Fletcher, New York, N. Y.

Application April 15, 1937, Serial No. 137,071

5 Claims. (Cl. 248—50)

This invention relates to new and useful improvements in a support for neon tubes.

The invention contemplates the construction of a novel type of support for neon tubes which may be adjusted longitudinally of the support upon which it is mounted for varying the distance between the neon tube and the sign or body upon which it is mounted.

Still further the invention contemplates the provision of a split tubular portion provided with protuberances upon its inner face which engage the shank portion of a tube support member for releasably holding this tube support member in position in the tubular portion.

Still further the invention provides for a support portion to be integrally formed with the split tubular portion for fixedly holding this device in position upon the sign or other body.

Still further the invention provides for a shank element which is adapted to continue from the end of said tubular portion and frictionally engage into a socket portion for supporting said shank element in various relative longitudinal positions.

Still further the invention provides for a means for locking a shank element in its adjusted positions in the socket member. More specifically, this locking means comprises a lever pivotally mounted intermediate of its ends and extending upwards into a position in which the bottom end of the shank portion of the tube support member will engage thereagainst for forcing the other end of the pivotal arm into slots or openings formed in the shank portion and the socket portion for fixedly connecting these sections together.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

The support for neon tubes, according to this invention, comprises a split tubular portion 10 into one end 10′ of which a shank portion of a tube support member is adapted to be engaged. A support portion 10ª continues from the other end 10″ of the tubular portion 10 and from the side opposite the split opening 11. Protuberances 12 are formed on the inside wall of the tubular portion 10 and are adapted to abut against the sides of the tube support member for frictionally maintaining this member in position in the tubular portion 10. The support portion 10ª is of substantially flat construction and is at right angles to the axis of the tubular portion 10 and is provided with a bayonet slot 13′ into which a bolt or other fastening element may be engaged for adjustably attaching the support upon a sign or other body.

Figure 1:
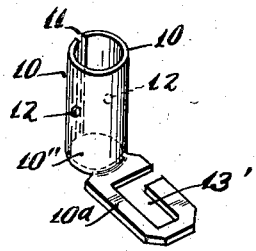
Fig. 1 is a perspective view of the support for neon tubes according to this invention.
Figure 2:
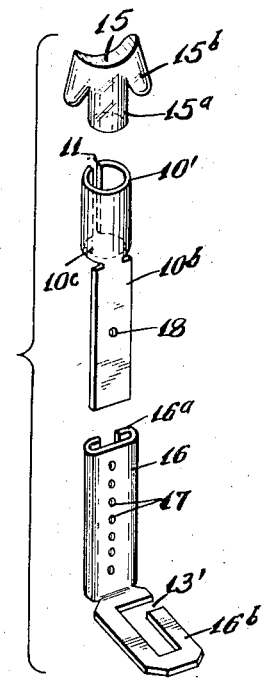
Fig. 2 is a perspective view of the parts forming a modified form of the invention.

The tube support member is not shown in connection with Fig. 1 but it is of a similar construction to that which is shown in Fig. 2 and is constructed of glass, or similar non-conducting material.

The bayonet slot 13′ permits the support for neon tubes to be fastened to the signs first by screwing the attaching screw into the sign and thereafter slipping the bayonet slot 13′ of the assembled support member, under the head of the screw and then tightening the screw.

Figure 3:
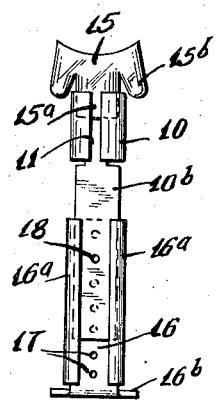
Fig. 3 is a front view of the parts shown in Fig. 2 in their assembled condition.

In the form of the invention shown in Figs. 2 and 3 a split tubular portion 10 is shown having a split 11 along one of its sides and into which the shank portion 15ª of a tube support member 15 may be engaged. A shank element 10ᵇ continues from the other end 10ᶜ of the tubular portion longitudinally of its axis and from the side opposite the split opening 11. A socket portion 16 is provided for supporting the shank element 10ᵇ in various relative longitudinal positions. The socket member comprises a strip of material 16 having longitudinal edge portions 16ª extending towards each other and a foot portion 16ᵇ continuing from one of the ends of the portion upon which the longitudinal edge portions 16ª are formed. This foot portion 16ᵇ is for the purpose of supporting the entire device upon a sign or similar body. A number of niches 17 are formed along the length of the socket member 16 and are to be selectively engaged by a protuberance 18 formed on the shank element for frictionally maintaining the shank element 10ᵇ in its various adjusted positions in the socket member 16.

The operation of this device is as follows:

The foot portion 16ᵇ of the socket member 16 is fixedly attached to the sign and the shank element 10ᵇ is engaged into the socket 16 so that the protuberance 18 formed thereon will engage one of the niches 17 formed in the socket member. The tube support member 15 is then engaged into the split tubular shank portion 10 to a position in which it is desired to attach the neon tube. Wires are then used for holding the neon tube in position on the tube support member 15 by engaging wire beneath the ears 15ᵇ formed on this support member. When the entire device is assembled and it is found that the neon tube is too near the sign upon which it is applied it is merely necessary to withdraw a portion of the shank element 10b from the socket 16 to extend the split tubular portion 10 and extend the neon tube from the sign.

Figure 4:
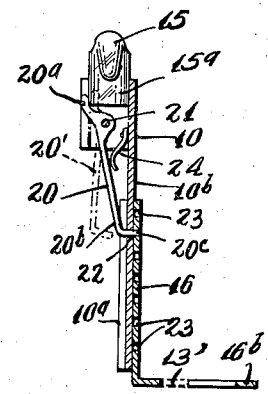
Fig. 4 is a sectional view of a still further modified form of the invention.
Figure 5:
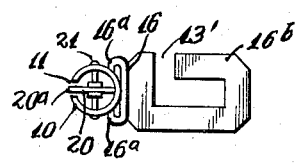
Fig. 5 is a plan view of the device shown in Fig. 4.

In the form of the invention shown in Figs. 4 and 5 a means is illustrated for locking the shank portion 10b of the tubular portion 10 in position upon the socket element 16. More specifically, this means comprises an arm 20 which is pivotally mounted intermediate of its ends by means of a pintle pin 21 which engages through the sides of the split tubular portion 10. One of the ends 20a of the arm 20 extends upwards into the split tubular portion 10 between the split 11 formed therein so as to be engaged by the bottom end 15a of the tube support member 15 when it is engaged therein. The other end 20b of the arm 20 is formed with a turned over end 20c which engages through a slot 22 formed in the shank element 10b.

This slot 22 is selectively alignable with a plurality of slots 23 formed in the socket member 16 and through which the turned over end 20c may also engage when the slots 22 and 23 are aligned for holding the shank element in a fixed position with relation to the socket member 16.

A leaf spring 24 operates between the inner face of the tubular portion 10 and a portion of the arm 20 between the pintle pin 21 and the turned over end 20c to normally disengage the turned over end 20c from the slots in the shank element 10b and the socket member 16 when the tube support member 15 is withdrawn to permit the shank element 10b to be moved within the socket member 16.

The operation of this form of the device is as follows:

Assuming that the position of the parts shown in Fig. 4 is one of its adjusted positions and that it is desired to lower the tubular portion 10 to a position in which the turned over end 20c of the arm 20 will engage the lowermost opening 23 in the socket portion 16. To accomplish this the tube support member 15 is withdrawn from the split tubular portion 10 permitting the leaf spring 24 to pivot the arm 20 to the position illustrated by the dot and dash lines 20' in Fig. 4 to disengage the turned over end 20c from the openings 22 and 23. The shank element 10b is then pressed inwards to a position in which the opening 22 will be aligned with the lowermost opening 23 and then re-engaging the tube support member 15 into the split tubular portion 10 forcing the end 20a into the split 11 and causing the turned over end 20 to engage the openings 22 and 23 for locking the shank element 10b and the socket member 16 in a fixed position.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. A support for neon tubes comprising a split tubular portion into one end of which a shank portion of a tube support member is adapted to engage, and a support portion continuing from the other end of said tubular portion and from the side opposite said split opening, said support portion being formed with a bayonet slot for releasably holding said support upon a sign or other surface.

2. A support for neon tubes comprising a split tubular portion into one end of which a shank portion of a tube support member is adapted to engage, a shank element continuing from the other end of said tubular portion longitudinally of its axis and from the side opposite said split opening, a socket for supporting said shank element in various relative longitudinal positions, and means for locking said shank in said adjusted positions.

3. A support for neon tubes comprising a split tubular portion into one end of which a shank portion of a tube support member is adapted to engage, a shank element continuing from the other end of said tubular portion longitudinally of its axis and from the side opposite said split opening, a socket for supporting said shank element in various relative longitudinal positions, and means for locking said shank in said adjusted positions, said means comprising an arm pivotally mounted intermediate of its ends and having an end formed with a turned over portion which is adapted to engage through a slot formed in the shank element which is selectively alignable with a plurality of slots formed in the socket member.

4. A support for neon tubes comprising a split tubular portion for receiving a shank portion of a tube support member, a shank element continuing from the other end of said tubular portion longitudinally of its axis and from the side opposite said split opening, a socket for supporting said shank element in various relative longitudinal positions, and means for locking said shank in said adjusted positions, said means comprising an arm pivotally mounted intermediate of its ends and having an end formed with a turned over portion which is adapted to engage through a slot formed in the shank element which is selectively alignable with a plurality of slots formed in the socket member, said arm having the other of its ends extending upwards into the path traversed by the shank portion of said tube support member and a resilient means for disengaging said turned over end from said slots.

5. A support for neon tubes comprising a split tubular portion for receiving a shank portion of a tube support member, a shank element continuing from the other end of said tubular portion longitudinally of its axis and from the side opposite said split opening, a socket for supporting said shank element in various relative longitudinal positions, and means for locking said shank in said adjusted positions, said means comprising an arm pivotally mounted intermediate of its ends and having an end formed with a turned over portion which is adapted to engage through a slot formed in the shank element which is selectively alignable with a plurality of slots formed in the socket member, said arm having the other of its ends extending upwards into the path traversed by the shank portion of said tube support member and a resilient means for disengaging said turned over end from said slots, said resilient means comprising a leaf spring acting between said split tubular portion and said arm.

MILTON FLETCHER.